(12) United States Patent
Tanabe

(10) Patent No.: US 12,298,594 B2
(45) Date of Patent: May 13, 2025

(54) OBJECTIVE LENS

(71) Applicant: KYOCERA SOC Corporation, Kanagawa (JP)

(72) Inventor: Takao Tanabe, Kanagawa (JP)

(73) Assignee: KYOCERA SOC Corporation, Yokohama (JP)

( * ) Notice: Subject to any disclaimer, the term of this patent is extended or adjusted under 35 U.S.C. 154(b) by 353 days.

(21) Appl. No.: 17/873,494

(22) Filed: Jul. 26, 2022

(65) Prior Publication Data

US 2023/0194831 A1    Jun. 22, 2023

(30) Foreign Application Priority Data

Dec. 20, 2021   (JP) .................. 2021-205936

(51) Int. Cl.
*G02B 9/10*   (2006.01)
(52) U.S. Cl.
CPC ..................... *G02B 9/10* (2013.01)
(58) Field of Classification Search
None
See application file for complete search history.

(56) References Cited

U.S. PATENT DOCUMENTS

| | | | | |
|---|---|---|---|---|
| 5,808,814 | A * | 9/1998 | Kudo | G02B 13/14 359/754 |
| 6,952,256 | B2 | 10/2005 | Roncone et al. | |
| 2015/0286037 | A1 * | 10/2015 | Ono | G02B 13/002 359/749 |
| 2015/0309289 | A1 * | 10/2015 | Nakamura | A61B 1/00096 359/740 |

FOREIGN PATENT DOCUMENTS

| | | |
|---|---|---|
| JP | H0426447 | 5/1992 |
| JP | H0426448 | 5/1992 |
| JP | H0431097 | 5/1992 |
| JP | H0567003 | 9/1993 |

(Continued)

OTHER PUBLICATIONS

Webb et al., "Optical Design Forms for DUV&VUV Microlithographic Processes", Optical Microlithography XIV, Proceedings of SPIE vol. 4346, 2001, pp. 566-576.

(Continued)

*Primary Examiner* — Darryl J Collins
(74) *Attorney, Agent, or Firm* — Dority & Manning, P.A.

(57) ABSTRACT

An objective lens configured by multiple lenses each consisting of a single lens has a retro ratio of 1.5 or higher. The multiple lenses configure a substantially afocal first lens group and a positive second lens group arranged in this order from a magnification side. The first lens group includes a 1a lens group having a negative power and a 1b lens group having a positive power which are arranged in this order from the magnification side. Provided that a focal length of the first lens group is represented by f(Gr1) and a focal length of a whole system of the objective lens is represented by f(total), a condition of $|f(Gr1)/f(total)|>10$ is satisfied. The second lens group includes a 2a lens group having a negative power and a 2b lens group having a positive power which are arranged in this order from the magnification side.

5 Claims, 20 Drawing Sheets

(56) References Cited

FOREIGN PATENT DOCUMENTS

| JP | 2000155267 | 6/2000 |
| JP | 2001356278 | 12/2001 |
| JP | 2003161881 | 6/2003 |
| JP | 2004118072 | 4/2004 |
| JP | 2004212920 | 7/2004 |
| JP | 2007212847 | 8/2007 |
| JP | 2010055006 | 3/2010 |

OTHER PUBLICATIONS

Zhang et al., "Systematic design of microscope objectives. Part I: System review and analysis", Adv. Opt. Techn. 2019, 35 pages.
Zhang et al., "Systematic design of microscope objectives. Part II: Lens modules and design principles", Adv. Opt. Techn., vol. 8, No. 5, 2019 pp. 349-384.
Zhang et al., "Systematic design of microscope objectives. Part III: miscellaneous design principles and system synthesis", Adv. Opt. Techn., vol. 8, No. 5, 2019 pp. 385-402.
Office Action (w/English translation) for corresponding Japanese application No. 2021-205936, dated Dec. 13, 2022, 8 pages.

* cited by examiner

OBJECTIVE LENS

TECHNICAL FIELD

The present invention relates to an objective lens, and particularly to an objective lens that satisfies a high numerical aperture, a long working distance, and a short focal length and is suitable for use in various inspection devices for semiconductors and flat panel displays (FPDs), for example.

BACKGROUND ART

A variety of objective lenses for use in various inspection devices for semiconductors, FPDs, and the like are known (for example, Patent Documents 1 to 8). The objective lenses of this kind are required to have a long working distance in addition to having a high numerical aperture and being compatible with short wavelength. Specifically, it is preferred that the light sources for various inspection devices use laser oscillation wavelengths of 193 nm, 248 nm, 266 nm, 355 nm, 365 nm or a wavelength near them, and the objective lenses have a numerical aperture (NA) of 0.75 or higher and a working distance of 1 mm or longer, preferably, 5 mm or longer (see Non-Patent Documents 1 and 2).

Also, to realize high-magnification observation while keeping the overall length of the optical system compact, it is preferred that the focal length of the objective lens is as short as possible. This is explained below with a concrete numerical example. For example, to realize a spatial resolution of 0.2 μm with a pixel size of 10 μm, the observation magnification is 10/0.2=200 times. Suppose that the focal length of the objective lens is 8 mm, the focal length of the imaging lens is 8×200=1600 mm, and under an image-side telecentric condition the overall length of the optical system reaches about two times the focal length, namely, 3.2 m. If the focal length of the objective lens is 3 mm, the focal length of the imaging lens is 3×200=600 mm, and the overall length of the optical system is only about 0.6 m×2=1.2 m. Thus, this numerical example shows that a short focal length of the objective lens is advantageous.

On the other hand, in a wavelength region called a deep ultraviolet region in which the used wavelength is less than 300 nm, the glass material used as a refractive material is virtually limited to quartz and fluorite. Also, in this wavelength region, cemented lenses cannot be used, of course. Further, in this wavelength region, since absorption by the coating material and absorption by the glass material itself are considerable, it is required to reduce the number of lenses configuring the objective lens as much as possible to efficiently use the light from the light source and to reduce damage to the optical system.

Even in a near ultraviolet region (the wavelength is 355 nm or longer) or a visible region (the wavelength is 400 nm or longer), the inspection devices use laser light of several watts, and illumination via the objective lens (coaxial epi-illumination) is often adopted. Such high-power laser light may cause damage to the adhesive joining the lenses, and therefore, it is general to avoid using a cemented lens in the objective lens for use in the inspection devices and to configure every lens in the objective lens as a single lens. Also, similarly to the optical design in the deep ultraviolet region, design is made with as small a number of lenses as possible to improve the light use efficiency and to suppress loss, such as flare, and stray light.

Therefore, an objective lens for use in an inspection device needs to satisfy a high numerical aperture, a long working distance, and a short focal length even under a condition in which the degree of freedom of the optical design is significantly limited compared to an ordinary objective lens.

PRIOR ART DOCUMENT(S)

Patent Document(s)

[Patent Document 1] US6952256B2
[Patent Document 2] JP2000-155267A
[Patent Document 3] JP2004-212920A
[Patent Document 4] JP2010-055006A
[Patent Document 5] JPH04-26447B2
[Patent Document 6] JPH04-31097B2
[Patent Document 7] JPH05-67003B2
[Patent Document 8] JPH04-26448B2

Non-Patent Document(s)

[Non-Patent Document 1] J. Webb et al., "Optical Design Forms for DUV&VUV Microlithographic Processes", Optical Microlithography XIV, Proceedings of SPIE Vol. 4346 (2001)

[Non-Patent Document 2] Yueqian Zhang and Herbert Gross, "Systematic design of microscope objectives" Adv. Opt. Techn. 2019; aop, Adv. Opt. Techn. 2019; 8(5): 385-402, Part I System review and analysis, Part II Lens modules and design principles, Part III miscellaneous design principles and system synthesis To make the working distance (namely, the distance from the last refractive surface to the image plane) longer than the focal length, a retrofocus type in which a negative lens group and a positive lens group are arranged in this order from the magnification side (namely, the incident surface side) is used. In the retrofocus type, if the ratio of the working distance to the focal length (retro ratio) is increased, the height of the axial beam incident on the positive lens group increases, and correction of spherical aberration becomes difficult. Also, due to considerable asymmetry of the lens power arrangement, correction of comatic aberration is difficult. Here, definition of the retro ratio R is indicated again by using a formula.

$$R=(\text{working distance})/(\text{focal length})$$

Therefore, in the previously known design examples, the retro ratio could not be made so high. Next, on the premise of use in inspection devices (namely, including no cemented lens), prior art examples in which NA is 0.75 or higher are shown below.

In Non-Patent Document 1 (FIGS. 8 and 9), two examples in each of which the focal length is 8 mm, the working distance is 9 mm, NA is 0.75, and the used wavelength is 248 nm are shown. The retro ratio is 9/8=1.125. Also, the lenses in the two examples mentioned here are all made of quartz or fluorite and no cemented lens is included.

In Patent Document 1 (Table 1A), an example in which the focal length is 8.00 mm, the working distance is 7.789 mm, NA is 0.857, and the used wavelength is 257.25 nm is shown. The retro ratio in this example is 7.789/8=0.973. Also, the lenses in this example are all made of quartz and no cemented lens is included.

In Example 1 of Patent Document 2, an example in which the focal length is 2.00 mm, the working distance is 2.46 mm, NA is 0.9, and the used wavelength is 248 nm is shown. The retro ratio in this example is 2.46/2=1.23. The lenses in this example are made of glass material having a refractive index of 1.5084, and from the refractive index, the material is estimated to be quartz. Also, no cemented lens is included.

In Example 1 of Patent Document 3, an example in which the focal length is 2.00 mm, the working distance is 0.48 mm, NA is 0.9, and the used wavelength is 248 mn is shown. The retro ratio in this example is 0.48/2=0.24. The lenses in this example are all made of quartz or fluorite, and no cemented lens is included.

When the numerical aperture is relatively small, the retro ratio can be made large.

In Example 1 of Patent Document 4, an example in which the focal length is 3.6 mm, the working distance is 12 mm, NA is 0.4, and the used wavelength is 248 to 549 nm is shown. The retro ratio in this example is 12/3.6=3.33, and this is larger than that of any other prior art example, but since NA is 0.4, which is small, this example is not suitable for use in inspection devices. Also, the lenses in this example are all made of at least one of quartz and fluorite. However, the example includes cemented lenses.

On the other hand, when a high-refractive-index glass material and/or cemented lenses are used, the degree of freedom of the optical design can be increased, and even with the conventional retrofocus type, the retro ratio can be made large.

In Example 3 of Patent Document 5, an example in which the focal length is 2.04 min, the working distance is 2.91 mm, and NA is 0.9 and which is usable in the visible range is shown. The retro ratio in this example is 2.91/2.04=1.426, and is large compared to the retro ratio of Non-Patent Documents 1 and 2 and Patent Documents 1, 2, and 3. However, this example uses a high refractive index glass material and cemented lenses, and is usable only in the visible range. Therefore, it is not suitable for use in inspection devices mentioned herein. Also, similar examples are also found in Patent Documents 6, 7, and 8, but these examples all use cemented lenses and are not suitable for use in inspection devices. Further, it is difficult to make a design that increases the retro ratio, preferably, by three times or more, with a similar configuration.

Thus, in the prior art examples, an example of design of an objective lens that is configured by a small number of lenses, uses no cemented lens, has a high numerical aperture, and has a high ratio of the working distance to the focal length as required for use in various inspection devices is not seen.

SUMMARY OF THE INVENTION

In view of the foregoing, a primary object of the present invention is to provide an objective lens that is configured by a small number of lenses, uses no cemented lens, has a high numerical aperture, and has a high ratio of the working distance to the focal length.

To achieve the above object, one aspect of the present invention provides objective lens (1) which is configured by multiple lenses (L), each consisting of a single lens having no cemented surface, and which has a retro ratio of 1.5 or higher, the retro ratio being a ratio of a working distance of the objective lens to a focal length of the objective lens, wherein the multiple lenses configure a first lens group (Gr1) that is substantially afocal and a second lens group (Gr2) having a positive power which are arranged in this order from a magnification side, the first lens group includes a 1a lens group (Gr1a) having a negative power and a 1b lens group (Gr1b) having a positive power which are arranged in this order from the magnification side, and provided that a focal length of the first lens group is represented by f(Gr1) and a focal length of a whole system of the objective lens is represented by f(total), a condition of |f(Gr1)/f(total)|>10 is satisfied, and the second lens group includes a 2a lens group (Gr2a) having a negative power and a 2b lens group (Gr2b) having a positive power which are arranged in this order from the magnification side.

Note that the working distance is an air-converted distance from the last refractive surface, which is one of the refractive surfaces of the multiple lenses (L) that is located on the most reduction side, to the image plane. Also, f(Gr1) is the focal length of the first lens group Gr1, and f(total) is the focal length of the whole system.

Preferably, every lens (L) is configured by using either one or both of synthetic quartz and fluorite ($CaF_2$).

Preferably, the 1a lens group (Gr1a) consists of a 1a lens (L1a) consisting of a single lens, and the 1b lens group (Gr1b) consists of a 1b lens (L1b) consisting of a single lens, and provided that a focal length of the 1a lens is represented by f(L1a) and a focal length of the 1b lens is represented by f(L1b), a condition of $-2.2<f(L1b)f(L1a)<-1.4$ is satisfied.

Preferably, the 2a lens group (Gr2a) consists of two single lenses (L2a1, L2a2, FIG. 6, FIG. 18) each having a negative focal length.

Preferably, the 2a lens group (Gr2a) consists of one single lens (FIG. 9, FIG. 15).

Preferably, the 2a lens group (Gr2a) consists of two single lenses (FIG. 12) which are a single lens (L2a) having a negative power and a single lens (L2b) having a positive power arranged in this order from the magnification side.

Thus, according to an embodiment of the present invention, it is possible to provide an objective lens that is configured by a small number of lenses, uses no cemented lens, has a high numerical aperture, and has a high ratio of the working distance to the focal length.

DETAILED DESCRIPTION OF THE INVENTION

Figure 5:
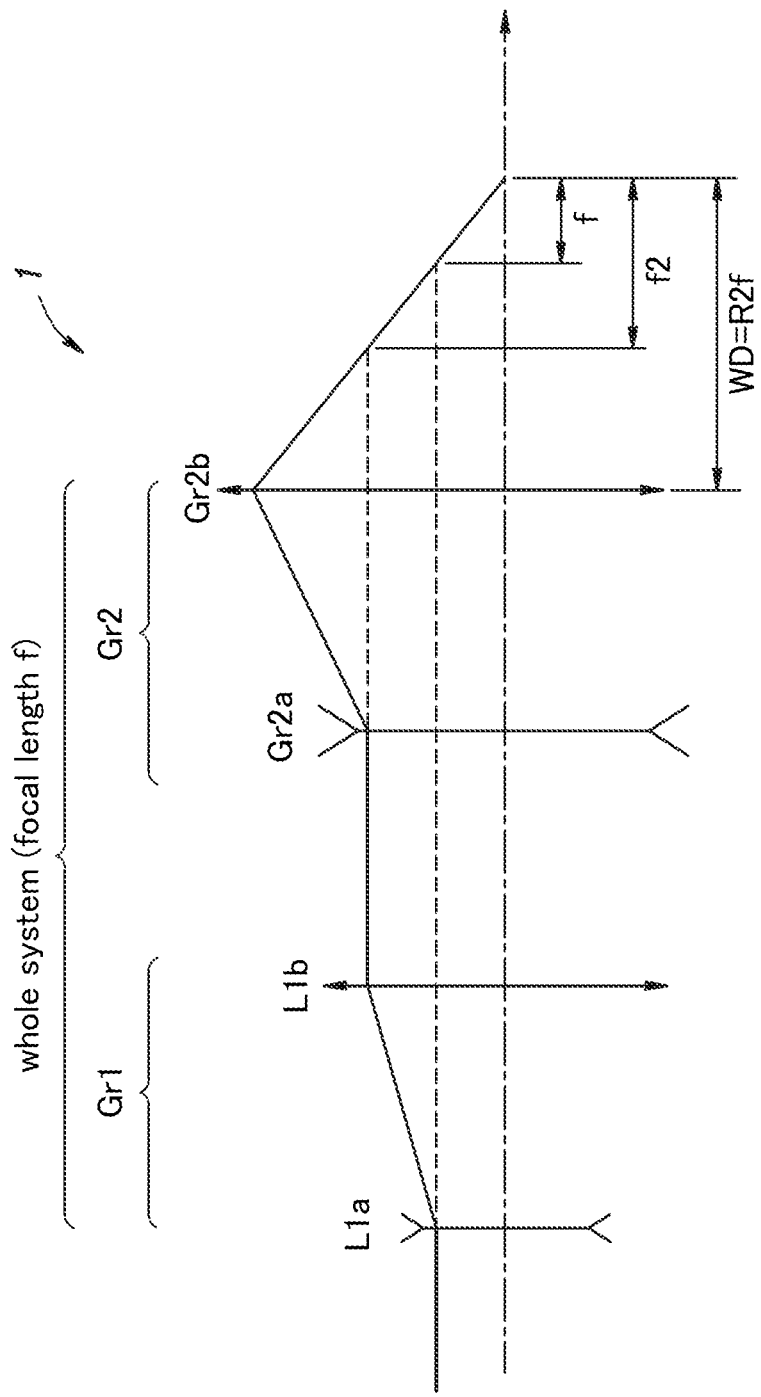
FIG. 5 is a power arrangement diagram of an objective lens according to an embodiment of the invention.

In the following, an embodiment of the present invention will be described with reference to the drawings. FIG. 5 is a power arrangement diagram of an objective lens 1 according to the embodiment. As shown in FIG. 5, to achieve the above object, the objective lens 1 is configured by a first lens group Gr1 that is substantially afocal as a group and a second lens group Gr2 having a positive focal length as a whole, where the first lens group Gr1 and the second lens group Gr2 are arranged in this order from the magnification side (namely, the incident surface side which is the left side in the drawing). Each lens group is constituted of multiple lenses L. Every lens L consists of a single lens having no cemented surface. The first lens group Gr1 includes a negative 1a lens L1a and a positive 1b lens L1b arranged in this order from the magnification side and each consisting of a single lens. For the second lens group Gr2, a lens configuration in which a 2a lens group Gr2a having a negative power and a 2b lens group Gr2b having a positive power arranged in this order from the magnification side is effective. Here, "power" is the inverse number of the focal length.

In the conventional design of a so-called long working distance objective lens in which the working distance is long relative to the focal length, it was common to employ a retrofocus type configuration to satisfy the requirement for a long working distance. In the retrofocus type configuration, a first lens group Gr1 having a negative power and a second lens group Gr2 having a positive power are arranged in this order from the magnification side, with a large air spacing between the first lens group Gr1 and the second lens group Gr2. Note that the working distance is an air-converted distance from the last refractive surface, which is one of the refractive surfaces of the multiple lenses constituting the objective lens 1 that is positioned on the most reduction side, to the image plane.

In the retrofocus type, if the ratio of the working distance to the focal length (the retro ratio R) is increased, the height of the axial beam incident on the positive lens group increases, and correction of the spherical aberration becomes difficult. Also, due to considerable asymmetry of the lens power arrangement, correction of the comatic aberration is difficult. As a result, the retro ratio R cannot be made very large, as mentioned above.

Figure 1:
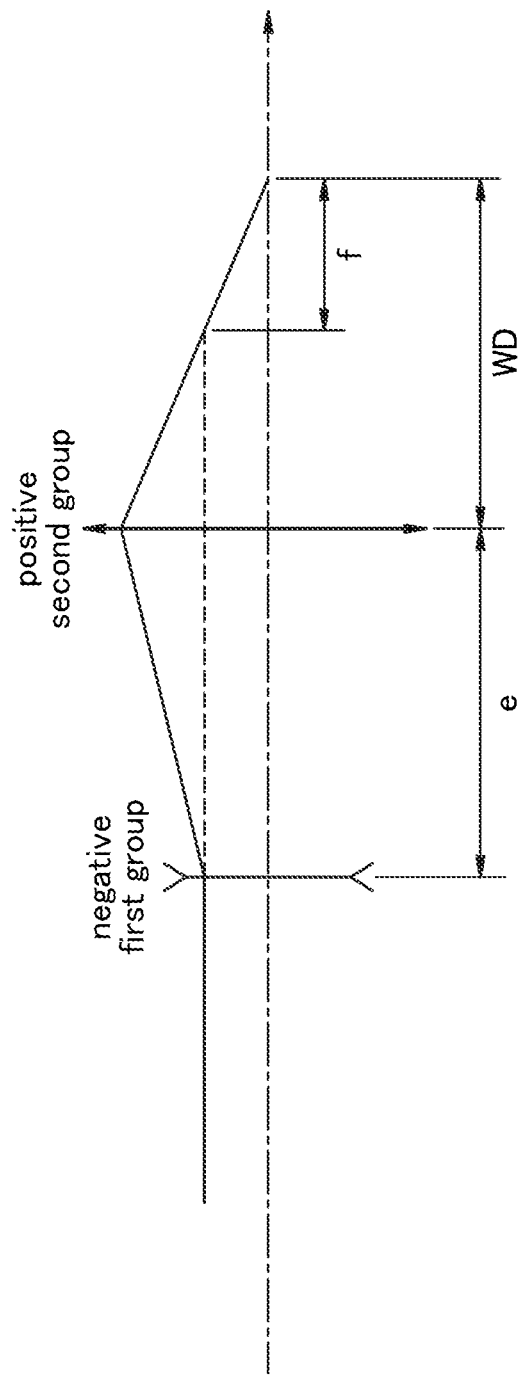
FIG. 1 is a power arrangement diagram of a retrofocus type.

With reference to FIG. 1, for the sake of simplicity, an optical system configured by thin lenses which constitute a first group having a focal length $f_1$ and a second group having a focal length $f_2$, with a spacing between the two groups being represented by e. Provided that the power of the first group is represented by $\varphi_1=1/f_1$, the power of the second group is represented by $\varphi_2=1/f_2$, the focal length of the whole system is represented by f, and the power of the whole system is represented by $\varphi=1/f$, $\varphi$ is given by the following formula (1).

$$\varphi=\varphi_1\varphi_2-e\varphi_1\varphi_2 \tag{1}$$

Also, provided that the working distance of this optical system is represented by WD, WD is given by the following formula (2).

$$WD=(1-e\varphi_1)/(\varphi_1+\varphi_2-e\varphi_1\varphi_2)=(1-e\varphi_1)f \tag{2}$$

Here, the retro ratio R is defined as the ratio of the working distance to the focal length as described above and is represented by the following formula (3).

$$R=WD/f=1-e\varphi_1 \tag{3}$$

By solving the formula (3) for $\varphi_1$, the following formula (4) is obtained.

$$\varphi_1=(1-R)/e \tag{4}$$

Since the lens spacing e is necessarily a positive value, it is understood from the formula (4) that $\varphi_1$ must be negative to make the retro ratio R greater than 1.

An example in which the retrofocus type is applied to an objective lens of an inspection device is Example 1 of Patent Document 2 and Example 1 of Patent Document 3.

As a method for improving the numerical aperture while making the correction of comatic aberration easy by improving the symmetry of the power arrangement, arrangement of a Double Gauss type can be conceived. This type is configured by a first group having a positive power, a second group having a negative power, and a third group having a positive power, which are arranged in this order from the magnification side. Further, the group having a negative power consists of a meniscus lens group in which concave surfaces inwardly face each other.

Example 1 of Patent Document 1 is basically a retrofocus type but a convex lens is disposed on the most magnification side and the middle lens group having a negative power is set in a shape having a feature of a Double Gauss type. Therefore, this is considered an example in which a Double Gauss type is incorporated in a retrofocus type. In this arrangement, the objective lens is configured by three lens groups including the positive-power first group constituted of a positive lens L11, the negative-power second group constituted of negative meniscus lenses L10, L9, and the positive-power third group constituted of lenses L8 to L1.

Figure 2:
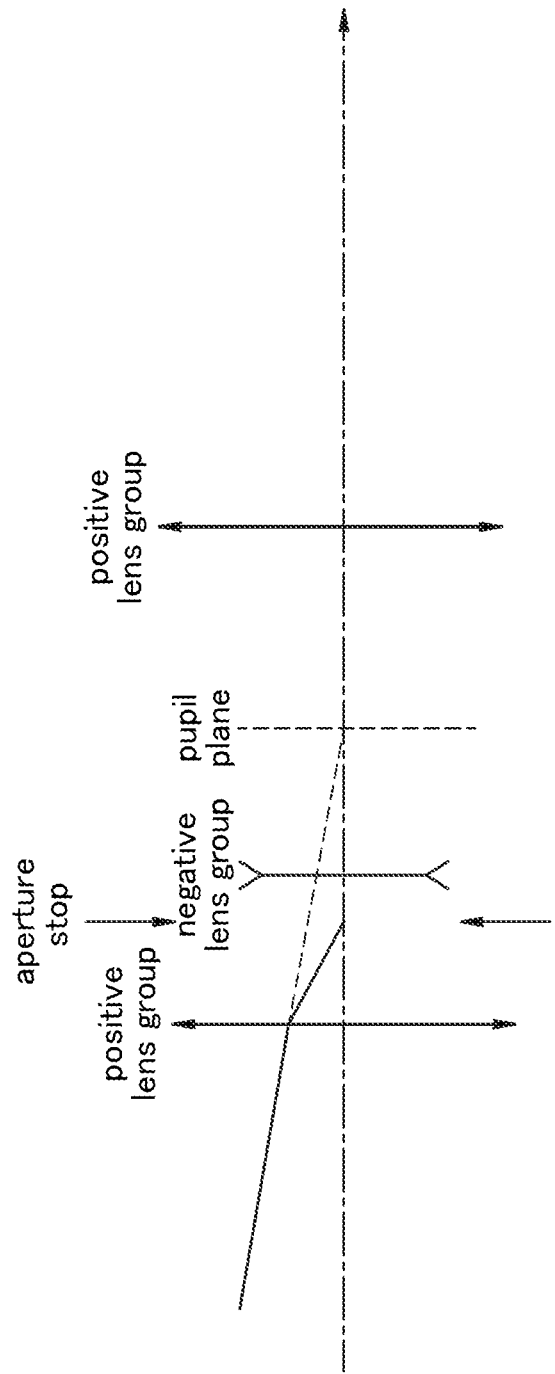
FIG. 2 is an explanatory diagram for explaining a pupil position of a Double Gauss type.
Figure 3:
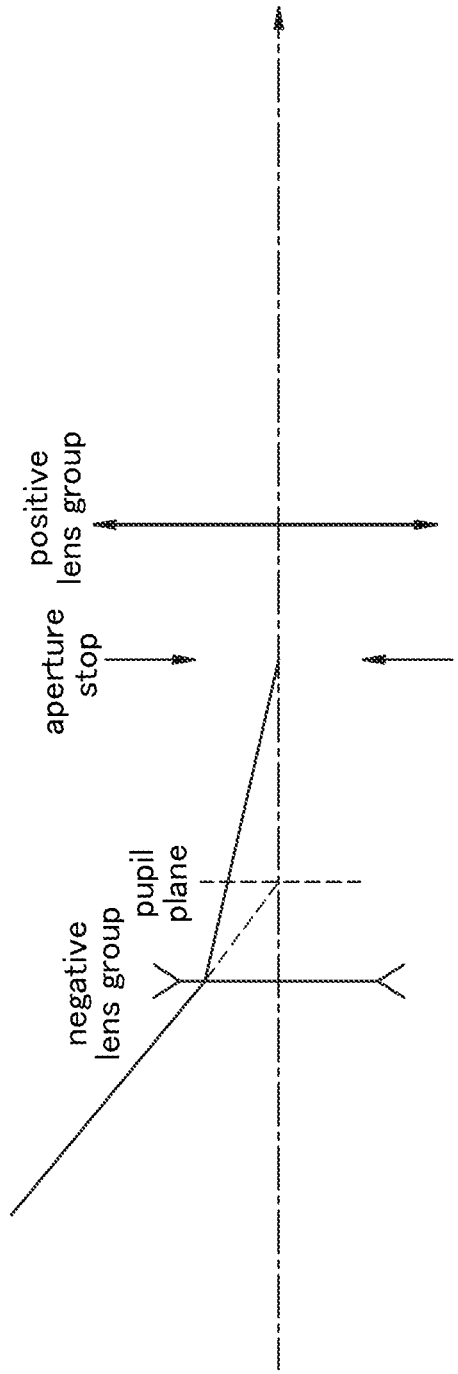
FIG. 3 is an explanatory diagram for explaining a pupil position of a retrofocus type.

In the Double Gauss type or the retrofocus type in which the Double Gauss is incorporated, the aberration correction is easy but on the other hand, there is a problem that compared to the retrofocus type, the pupil position exists on an inner side than the surface located on the most magnification side. This is because, as shown in FIG. 2, an entrance pupil (namely, the virtual image of the stop) is formed in a direction away from the most magnification side (the left side in the drawing) due to the effect of the positive lens group disposed on the most magnification side. On the other hand, in the retrofocus type, as shown in FIG. 3, the lens group on the most magnification side (the left side in the drawing) has a negative power, and therefore, the virtual image of the stop is formed in a direction approaching the magnification side.

In an actual device, the pupil plane positioned more inside of the objective lens is disadvantageous in view of arrangement. The reason for this is as follows. If the pupil is positioned more inside, the luminous flux facing the objective lens spreads more widely. Accordingly, there arises a problem that various optical elements (for example, a beam splitter for introducing the illumination light) positioned between the objective lens and the imaging lens may become large in size or the space for inserting them may become limited.

To sum up the foregoing, though the retrofocus type is suitable for an objective lens of an inspection device, correction of the spherical aberration and the comatic aberration is difficult due to the lens group having a strong negative power and positioned on the magnification side. To solve this problem, an approach of disposing a lens group having a positive power on the most magnification side to incorporate a Double Gauss type. However, in the Double Gauss type, due to the effect of the lens group having a positive power and disposed on the most magnification side, there is a problem that the pupil is positioned distant from the most magnification side.

To address such problems, the present disclosure provides problem solving means which achieves favorable correction of the spherical aberration and the comatic aberration while maintaining the advantageous feature of the pupil position of the retrofocus type, as described in the following.

Specifically, the objective lens 1 has a lens configuration in which the first lens group Gr1 that is substantially afocal as a group and the second lens group Gr2 having a positive focal length as a whole are arranged in this order from the magnification side. The first lens group Gr1 is constituted of a negative 1a lens L1a and a positive 1b lens L1b which are arranged in this order from the magnification side and each of which consists of a single lens. The second lens group Gr2 is constituted of the 2a lens group Gr2a having a negative power and the 2b lens group Gr2b having a positive power, which are arranged in this order from the magnification side.

Figure 4:
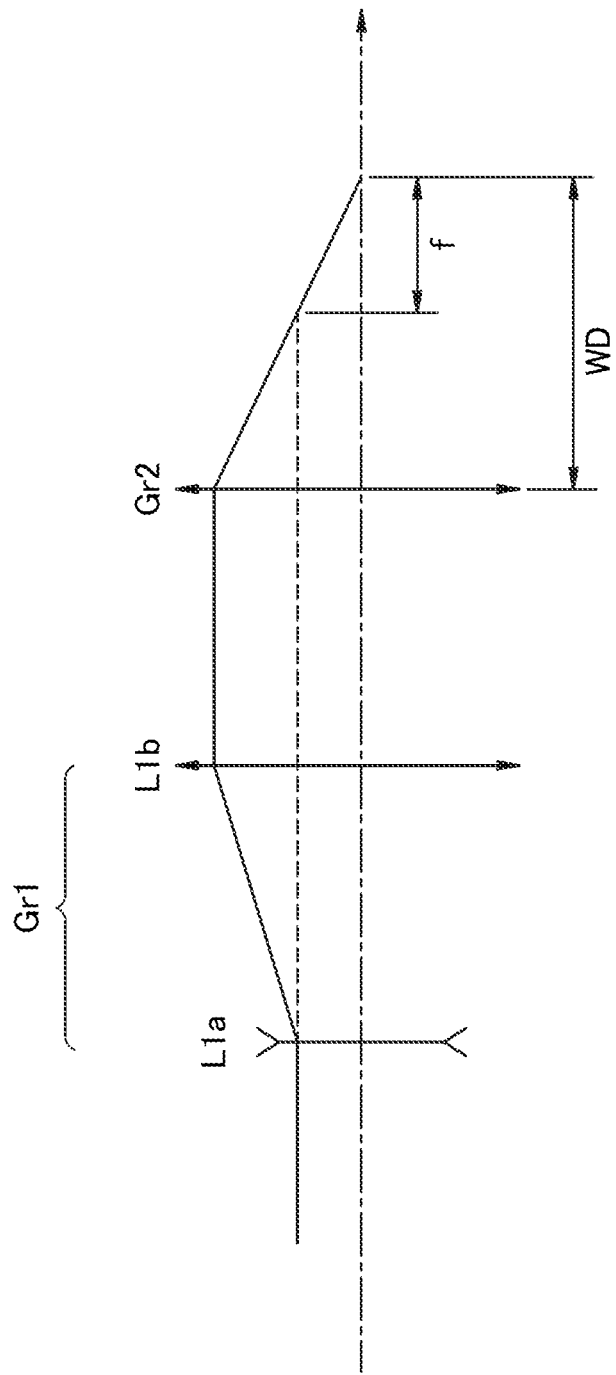
FIG. 4 is a power arrangement diagram of an afocal converter type.

First, a model in which this arrangement is simplified as follows will be discussed. As shown in FIG. 4, an optical system is configured by the first lens group Gr1, which is constituted of the negative 1a lens L1a and the positive 1b lens L1b, each consisting of a single lens, and which is substantially afocal as a group, and the second lens group Gr2 having a positive power. This is referred to as an afocal converter type.

The first lens group Gr1 serves as a so-called afocal converter. When parallel light enters from the magnification side, the parallel light first enters the 1a lens L1a, and then enters the 1b lens L1b as a divergent luminous flux. The light that has entered the 1b lens L1b is converted into substantially parallel light due to the effect of the positive lens and enters the second lens group Gr2.

When the focal length of the 1a lens L1a is represented by $f_{1a}$ and the focal length of the 1b lens L1b is represented by $f_{1b}$, an afocal ratio m is given by the following formula (5). Note that this formula substantially holds even if the first lens group Gr1 is not perfectly afocal.

$$m = -f_{1b}/f_{1a} \quad (5)$$

Assume that the light exiting the 1b lens L1b enters the second lens group Gr2. When the focal length of the second lens group Gr2 is represented by $f_2$ and the focal length (synthetic focal length) of the whole system is represented by f, f is given by the following formula (6).

$$f = f_2/m = -(f_{1a}/f_{1b})f_2 \quad (6)$$

The back focus of this optical system is $f_2$ as a parallel luminous flux enters the second lens group Gr2. Accordingly, the retro ratio $R_1$ of this optical system is given by the following formula (7).

$$R_1 f_2/f = m = -f_{1b}/f_{1a} \quad (7)$$

Thus, by making the absolute value of φ1a greater than the absolute value of φ1b, the condition that the retro ratio is greater than 1 ($R_1 > 1$) can be obviously realized.

Prior art examples based on this optical arrangement are shown in Patent Documents 5, 6, 7, and 8. In these prior art examples, it is not recognized that the synthesis of the multiple lens groups on the magnification side is substantially afocal, and it is only intended to increase the working distance by employing the retrofocus type. Also, in these examples, the retro ratio R is at most 2 or less, and it is not possible to achieve both a long working distance and a short focal length that are demanded. Further, all of these examples assume use with visible light and uses means for facilitating aberration correction, such as a high-refraction glass material and cemented lenses, and therefore, they are not suitable for use in inspection devices.

Furthermore, in the examples shown in Patent Documents 5, 6, 7, and 8, the lens group that follows the afocal system and that is positive as a whole is not configured to include a negative lens group. The reason for this is that by disposing a movable group in an afocal position, a configuration of an objective lens with a so-called correction ring used for changing the spherical aberration is intended. Therefore, a long working distance and a short focal length as those of the invention disclosed in the present description are not realized.

Thus, with a simple afocal converter type described above, an objective lens with a long working distance and a short focal length suitable for use in an inspection device cannot be realized. To solve this problem, in the present invention, the second lens group Gr2 is divided into the 2a lens group Gr2a having a negative power and the 2b lens group Gr2b having a positive power. Namely, the second lens group Gr2 is configured as a retrofocus type. When the retro ratio of the second lens group Gr2 is represented by $R_2$, the working distance (WD) is given by the formula (8).

$$WD = f_2 \times R_2 \quad (8)$$

By substituting $f \times R_1$ for $f_2$ in the formula (8) according to the formula (7), the following formula (9) is obtained.

$$WD = f \times R_1 \times R_2 \quad (9)$$

Therefore, the overall retro ratio R is expressed by the following formula (10).

$$R = WD/f = R_1 \times R_2 = m \times R_2 \quad (10)$$

According to the present invention, the power arrangement of the objective lens 1 is as shown in FIG. 5.

The overall retro ratio R is expressed as a product of the afocal ratio in and the retro ratio $R_2$ of the second lens group Gr2 which is a retrofocus type. Therefore, by making the overall retro ratio R shared by the afocal converter (the first lens group Gr1) and the retrofocus type lens group (the second lens group Gr2), it is possible to achieve a high retro ratio R without increasing the burden on each lens group regarding the aberration correction. According to the aforementioned prior art examples, realization of a retrofocus type having the retro ratio R of about 1.5 is easy. Also, configuration of an afocal system with an afocal magnification of about 2 times is easy. Therefore, by combining partial systems that can be easily configured, it is possible to easily achieve a high retro ratio R. This type is referred to as an improved afocal converter type.

The arrangement of the afocal converter in which a negative lens and a positive lens are arranged in this order from the magnification side is more advantageous than the retrofocus type from the viewpoint of pupil position. The reason for this is that the positive lens group of the afocal converter forms a virtual image of the stop on a side more distant than the magnification side, and by forming this virtual image again as a virtual image by the negative lens group on the most magnification side, the virtual image of the stop is formed on the more magnification side (namely, the incident surface side) than in the retrofocus type. Further, in the improved afocal converter type, the second lens group Gr2 is divided into the 2a lens group Gr2a having a negative power and the 2b lens group Gr2b having a positive power. Thereby, the degree of freedom when the pupil as the image of the aperture stop which is usually disposed near the 2b lens group Gr2b is converted into a virtual image by the 2a lens group Gr2a is increased. Therefore, there is an advantage that it is easy to reconcile the pupil position and the aberration correction. The advantage regarding the pupil position has not been noticed in the examples of relatively small objective lenses known in the past.

In the configuration disclosed in the present description, a negative lens is disposed on the most magnification side, and it is conventionally considered that aberration correction is difficult in such a configuration. To perform the aberration correction as a whole, the inventor has conceived canceling overcorrected aberration produced by the afocal converter section with under-corrected aberration of the positive lens group that follows after that. This can correct the aberration more favorably as a whole system than when correcting the aberration in each partial group. As a result, a short focal length and a long working distance that were not achieved in the conventional retrofocus type, Double Gauss type, or afocal type in which a convex lens is disposed on the most magnification side could be both achieved. Further, the objective lens 1 with excellent aberration correction could be newly configured with as small a number of lenses as possible.

As support that the configuration disclosed in the present description is novel, prior art examples (FIG. 9 of Non-Patent Document 1 and Table 1 of Patent Document 1) will be exemplarily discussed.

Figure 9:
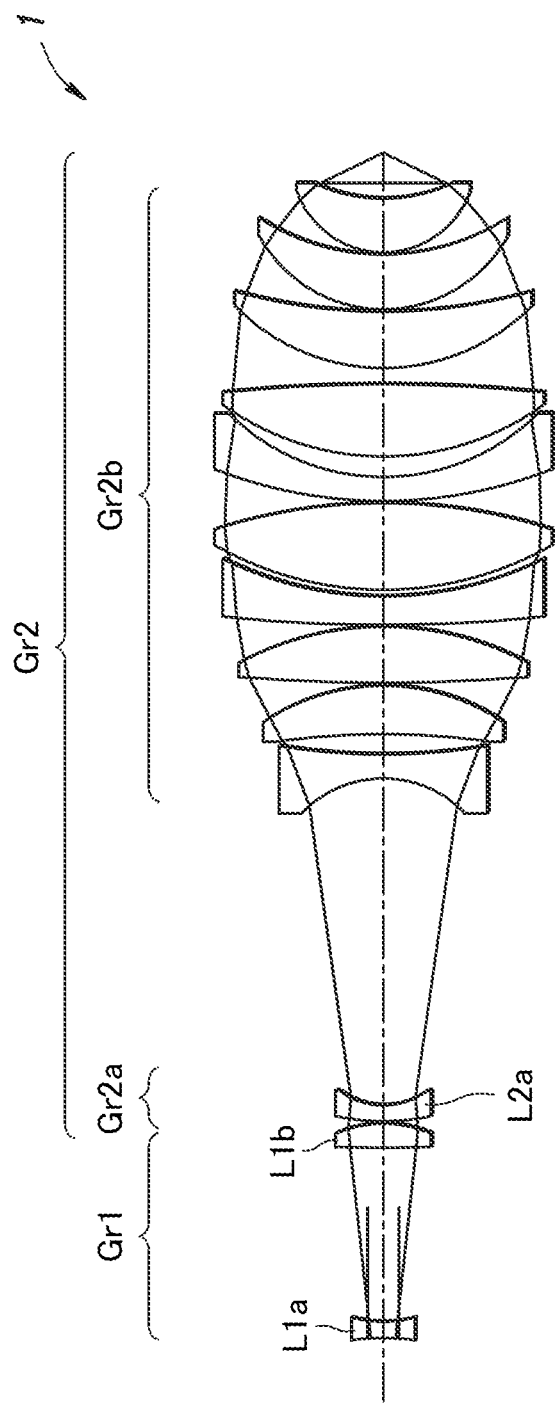
FIG. 9 is a lens layout of an objective lens of Example 2.

In the configuration of FIG. 9 of Non-Patent Document 1, a substantially afocal lens group constituted of a positive lens and a negative lens and a lens group in which a negative lens group and a positive lens group are disposed via a distance and which is positive as a whole are arranged in this order from the most magnification side. In this configuration the afocal lens group is constituted of a positive lens and a negative lens arranged in this order to favorably correct the aberration when setting a long focal length to make the working distance long. If, in this configuration, the afocal group were configured by a negative lens and a positive lens arranged in this order as disclosed in the present description, and if it is attempted to contain the ratio between the focal length and the working distance within a range demanded beforehand, it is difficult to correct the aberration due to asymmetry of the power arrangement. This is also the case for Patent Document 1 (Table 1). Further, in these prior art examples, no attention is paid to the aberration correction effect of the afocal type (namely, the effect of minimizing the aberration as a whole by making the aberration of the afocal lens group and the aberration of the positive lens group cancel each other). As a result, the afocal ratio m of the afocal lens group is small and does not contribute to favorably correcting the aberration as a whole.

Therefore, the configuration disclosed in the present description is not just an improvement of these prior art examples.

In addition to the above, Non-Patent Document 2, in which microscope objective lenses including an objective lens for inspection mentioned in the present description are comprehensively classified, also fails to mention the improved afocal converter type as disclosed in the present description. Therefore, the configuration disclosed in the present description is a novel type that was not known in the past.

Note that the objective lens 1 described herein assumes use with the laser oscillation wavelength in the deep ultraviolet region such as, for example, the wavelength of an argon-ion laser (363.8 nm) or harmonics (355 nm, 266 nm) of a YAG laser or excimer lasers (ArF, KrF). On the other hand, the objective lens 1 described herein of course can be applied to visible laser such as, for example, the second harmonic of YAG laser (532 nm) or Ar laser (488 nm) or to the near infrared laser oscillation wavelength. Also, in such cases, the material forming the lens may be ordinary optical glass in addition to quartz and fluorite.

According to the present invention, it is possible to configure the objective lens 1 that has a high numerical aperture and can achieve both a long working distance and a short focal length such that the retro ratio R is about 1.5 to 3.

Example 1

Figure 6:
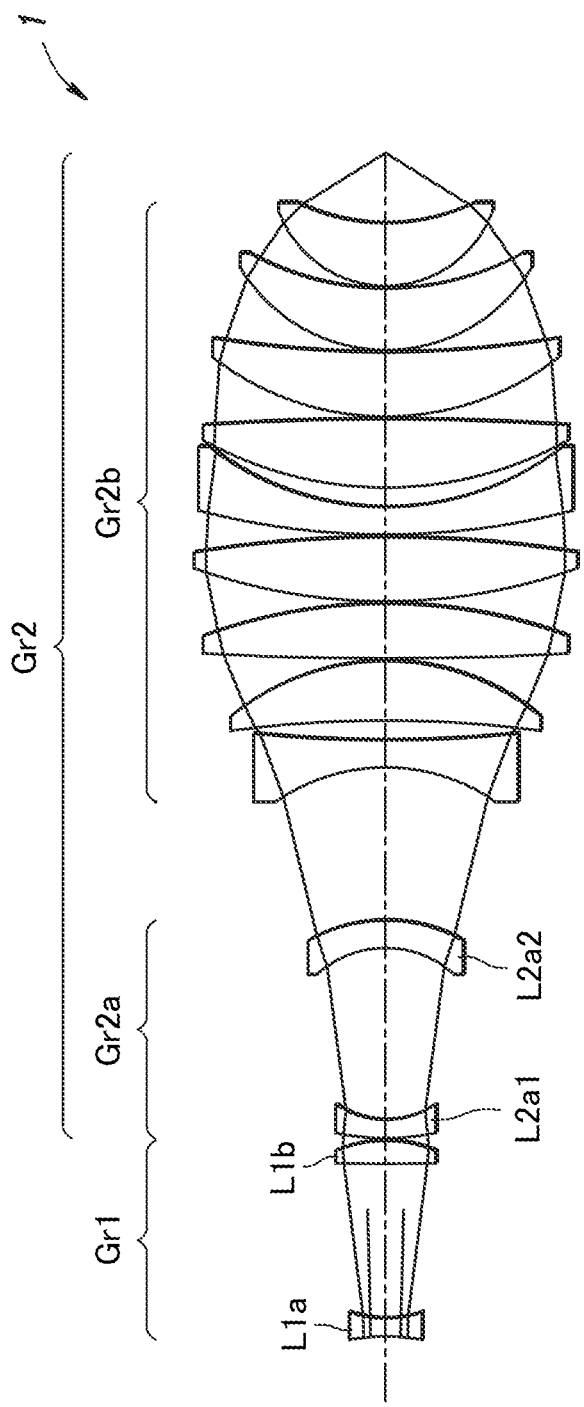
FIG. 6 is a lens layout of an objective lens of Example 1.
Figure 7:
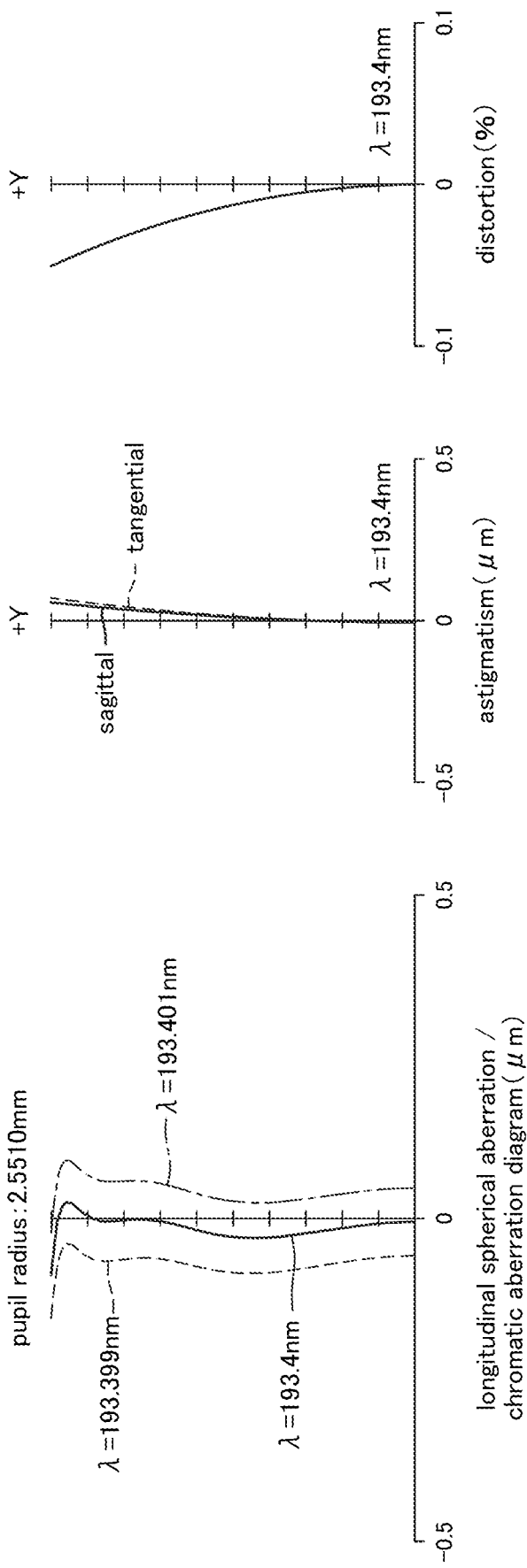
FIG. 7 is a longitudinal aberration diagram of the objective lens of Example 1.
Figure 8:
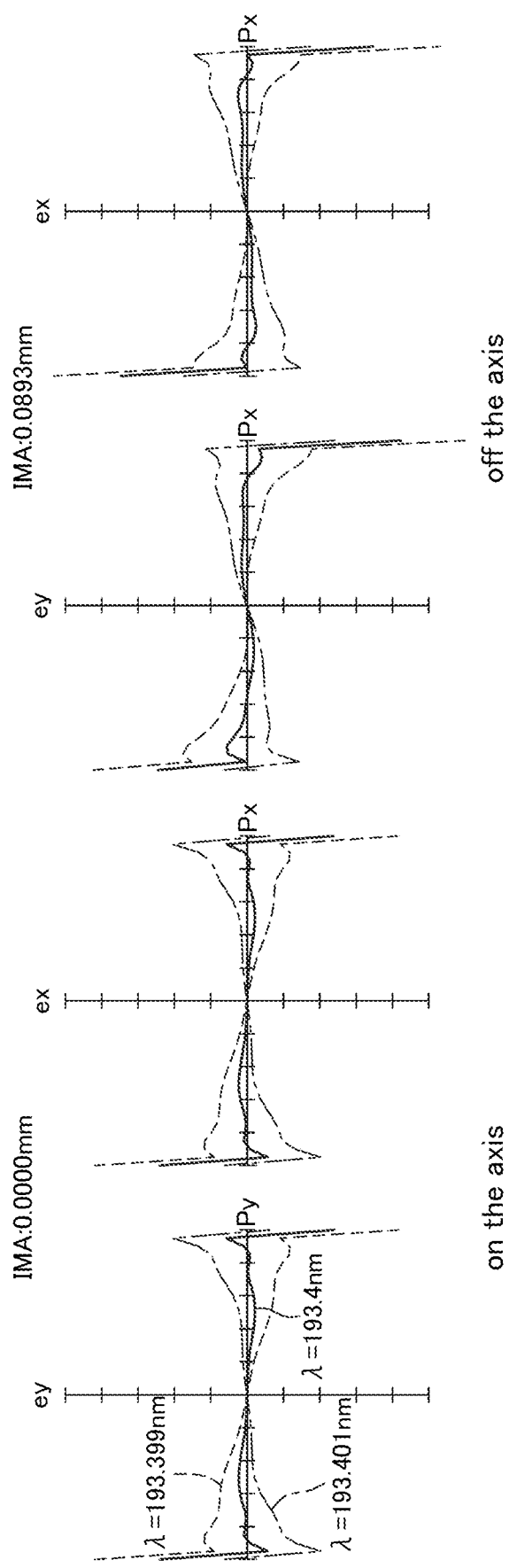
FIG. 8 is a lateral aberration diagram of the objective lens of Example 1.

FIGS. 6 to 8 respectively show a lens layout, a longitudinal aberration diagram, and a lateral aberration diagram of an objective lens 1 of Example 1. In the objective lens 1 of Example 1, the wavelength is 193.4 nm±0.001 nm, the focal length (f(total)) is 3 mm, NA is 0.85, the working distance is 9.87 mm, and the field of view φ is 0.18 mm. The retro ratio R is 9.87/3=3.29. The objective lens 1 of this example is constituted of single lenses each of which is made of quartz (including synthetic quartz. The same applies below.) or fluorite (CaF2) and has no cemented surface, namely, the objective lens 1 includes no cemented lens. As shown in FIG. 6, the objective lens 1 of this example is a combination of a substantially afocal first lens group Gr1 and a positive second lens group Gr2 which are arranged in this order from the magnification side (the left side in the drawing). The first lens group Gr1 is constituted of a 1a lens L1a consisting of a negative single lens and a 1b lens L1b consisting of a positive single lens which are arranged in this order from the magnification side. The second lens group Gr2 is configured by a 2a lens group Gr2a, which is constituted of two negative single lenses, namely, a 2a1 lens L2a1 and a 2a2 lens L2a2, and is negative as a whole, and a 2b lens group Gr2b which is positive as a whole, where the lens groups Gr2a and Gr2b are arranged in this order from the magnification side. Also, the focal length (f(Gr1)) of the first lens group Gr1 is 67 mm and hence |f(Gr1)/f(total)|22.33. Therefore, the condition of the present invention (|f(Gr1)/f(total)|>10) is satisfied. Since f(L1a)=−20.12 and f(L1b)=34.16, the afocal ratio m of the first lens group Gr1 is −1.70 (m=f(L1b)/f(L1a)=−1.70).

The lens data of this example is shown in Table 1.

TABLE 1

| surface number | radius of curvature [mm] | thickness [mm] | material | refractive index at used wavelength (193.4 nm) |
|---|---|---|---|---|
| object plane | ∞ | ∞ | | |
| 1 | ∞ | 17.61258 | | |
| 2 (pupil plane) | ∞ | −17.61258 | | |
| 3 | −30.23596 | 2.55090 | fluorite | 1.50135 |
| 4 | 15.56829 | 21.66693 | | |
| 5 | 361.14864 | 3.18863 | fluorite | 1.50135 |

TABLE 1-continued

| surface number | radius of curvature [mm] | thickness [mm] | material | refractive index at used wavelength (193.4 nm) |
|---|---|---|---|---|
| 6 | −17.92609 | 0.38264 | | |
| 7 | 34.12808 | 2.55090 | quartz | 1.56026 |
| 8 | 12.12313 | 24.06446 | | |
| 9 | −14.29305 | 3.82635 | quartz | 1.56026 |
| 10 | −22.28283 | 21.42547 | | |
| 11 | −27.18939 | 3.82635 | quartz | 1.56026 |
| 12 | 170.60669 | 2.83370 | | |
| 13 | −162.79200 | 8.29043 | fluorite | 1.50135 |
| 14 | −34.12808 | 0.38264 | | |
| 15 | 440.08937 | 7.65270 | fluorite | 1.50135 |
| 16 | −74.57223 | 0.38264 | | |
| 17 | 80.06956 | 8.92815 | fluorite | 1.50135 |
| 18 | −173.59835 | 0.38264 | | |
| 19 | 103.56958 | 3.82635 | quartz | 1.56026 |
| 20 | 40.51639 | 2.82213 | | |
| 21 | 52.75210 | 9.54037 | fluorite | 1.50135 |
| 22 | −399.12147 | 0.38264 | | |
| 23 | 39.38525 | 8.95366 | fluorite | 1.50135 |
| 24 | 147.66752 | 0.38264 | | |
| 25 | 23.82242 | 8.55827 | fluorite | 1.50135 |
| 26 | 39.53815 | 0.38264 | | |
| 27 | 15.89263 | 8.77510 | quartz | 1.56026 |
| 28 | 28.18370 | 9.87534 | | |
| image plane | ∞ | 0.00000 | | |

Example 2

Figure 10:
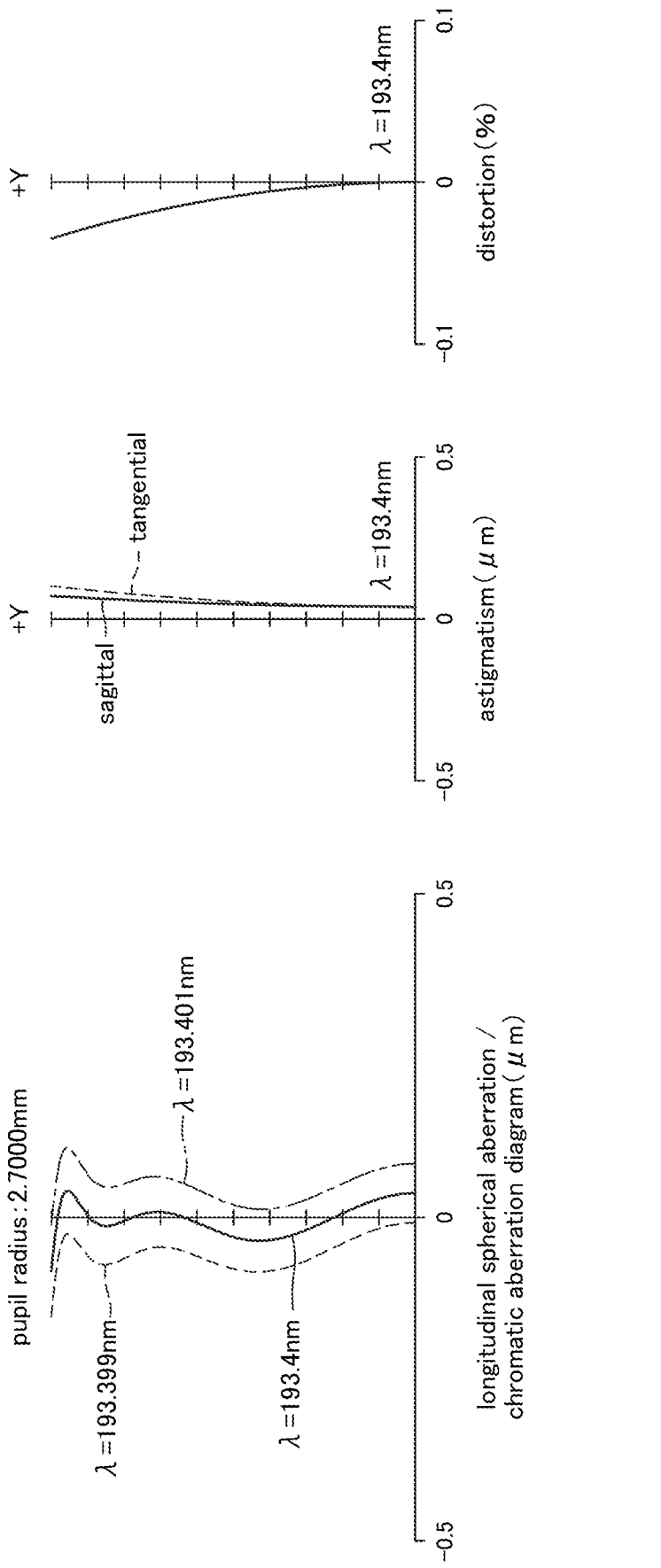
FIG. 10 is a longitudinal aberration diagram of the objective lens of Example 2.
Figure 11:
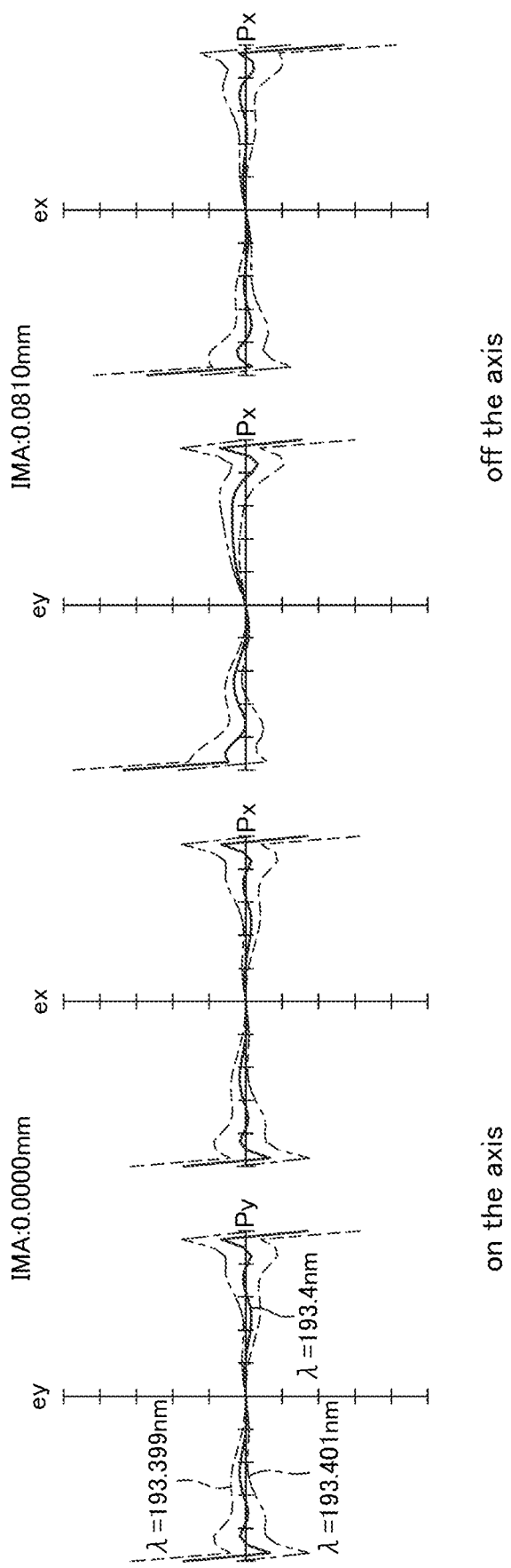
FIG. 11 is a lateral aberration diagram of the objective lens of Example 2.

FIGS. 9 to 11 respectively show a lens layout, a longitudinal aberration diagram, and a lateral aberration diagram of an objective lens 1 of Example 2. In the objective lens 1 of Example 2, the wavelength is 193.4 nm±0.001 nm, the focal length is 3 mm, NA is 0.9, the working distance is 7.7 mm, and the field of view φ is 0.18 mm. The retro ratio R is 7/3=2.33. The objective lens 1 of this embodiment is constituted of single lenses each of which is made of quartz or fluorite and has no cemented surface, namely, the objective lens 1 includes no cemented lens. As shown in FIG. 9, the objective lens 1 of this embodiment is a combination of a substantially afocal first lens group Gr1 and a positive second lens group Gr2 which are arranged in this order from the magnification side (the left side in the drawing). The first lens group Gr1 is constituted of a negative 1a lens L1a consisting of a single lens and a positive 1b lens L1b consisting of a single lens which are arranged in this order from the magnification side. The second lens group Gr2 is configured by a negative 2a lens group Gr2a consisting of a negative single lens and a 2b lens group Gr2b which is positive as a whole, where the lens groups Gr2a and Gr2b are arranged in this order from the magnification side. Also, the focal length (f(Gr1)) of the first lens group Gr1 is 48 mm and hence |f(Gr1)/f(total)|=16. Therefore, the condition of the present invention (|f(Gr1)/f(total)|>10) is satisfied. Since f(L1a)=−25.14 and f(L1b)=37.74, the afocal ratio m of the first lens group Gr1 is −1.50(m=f(L1b)/f(L1a)=−1.50).

The lens data of this example is shown in Table 2.

TABLE 2

| surface number | radius of curvature[mm] | thickness [mm] | material | refractive index at used wavelength (193.4 nm) |
|---|---|---|---|---|
| object plane | ∞ | ∞ | | |
| 1 | ∞ | 21.88863 | | |
| 2 (pupil plane) | ∞ | −21.88863 | | |

TABLE 2-continued

| surface number | radius of curvature[mm] | thickness [mm] | material | refractive index at used wavelength (193.4 nm) |
|---|---|---|---|---|
| 3 | −37.79722 | 2.70000 | fluorite | 1.50135 |
| 4 | 19.36264 | 29.23541 | | |
| 5 | 269.98836 | 4.05000 | fluorite | 1.50135 |
| 6 | −20.24852 | 0.40500 | | |
| 7 | 38.18273 | 2.70000 | quartz | 1.56026 |
| 8 | 12.48357 | 54.81131 | | |
| 9 | −19.36264 | 4.05000 | quartz | 1.56026 |
| 10 | 108.03897 | 3.40620 | | |
| 11 | −129.72959 | 8.10000 | fluorite | 1.50135 |
| 12 | −36.45875 | 0.40500 | | |
| 13 | 269.98836 | 9.45000 | fluorite | 1.50135 |
| 14 | −51.99409 | 0.40500 | | |
| 15 | 269.98836 | 4.72500 | quartz | 1.56026 |
| 16 | 60.88181 | 1.07561 | | |
| 17 | 56.96619 | 14.58000 | fluorite | 1.50135 |
| 18 | −93.31116 | 0.40500 | | |
| 19 | 78.18587 | 4.05000 | quartz | 1.56026 |
| 20 | 36.91061 | 3.37633 | | |
| 21 | 46.17257 | 12.15000 | fluorite | 1.50135 |
| 22 | −269.98836 | 2.69887 | | |
| 23 | 35.13934 | 9.45000 | fluorite | 1.50135 |
| 24 | 91.81046 | 0.40500 | | |
| 25 | 23.94630 | 9.18000 | quartz | 1.56026 |
| 26 | 38.43890 | 0.40500 | | |
| 27 | 15.46305 | 9.04500 | quartz | 1.56026 |
| 28 | 27.55530 | 7.70294 | | |
| image plane | ∞ | 0.00000 | | |

Example 3

Figure 12:
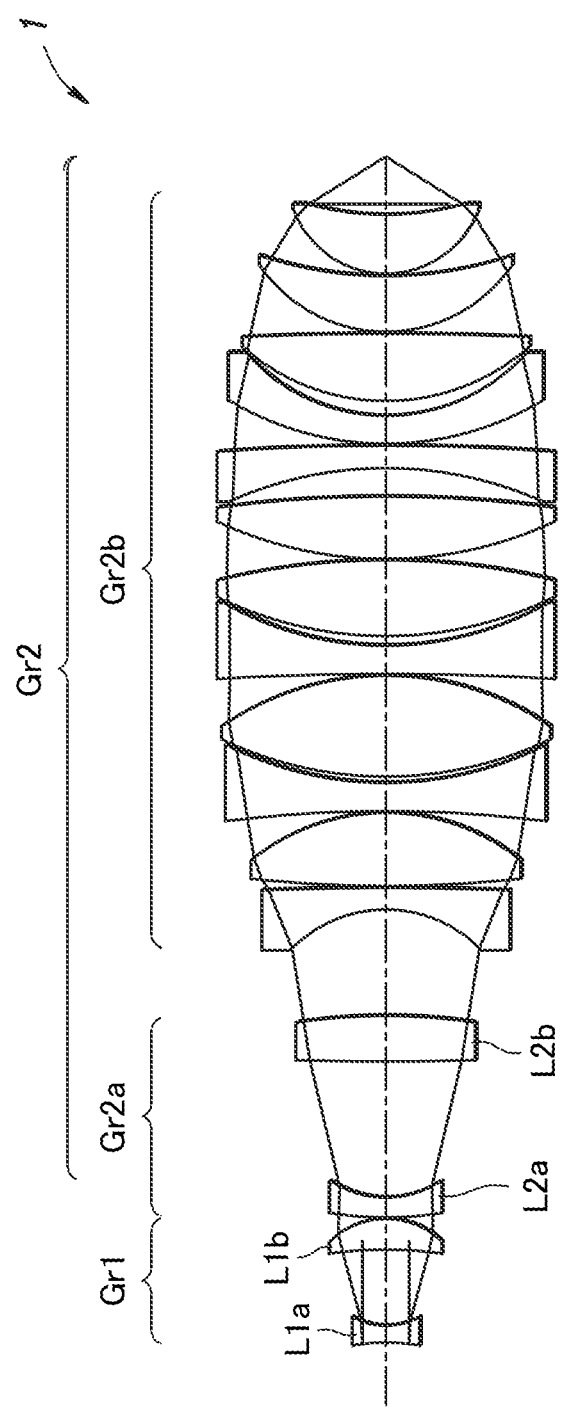
FIG. 12 is a lens layout of an objective lens of Example 3.
Figure 13:
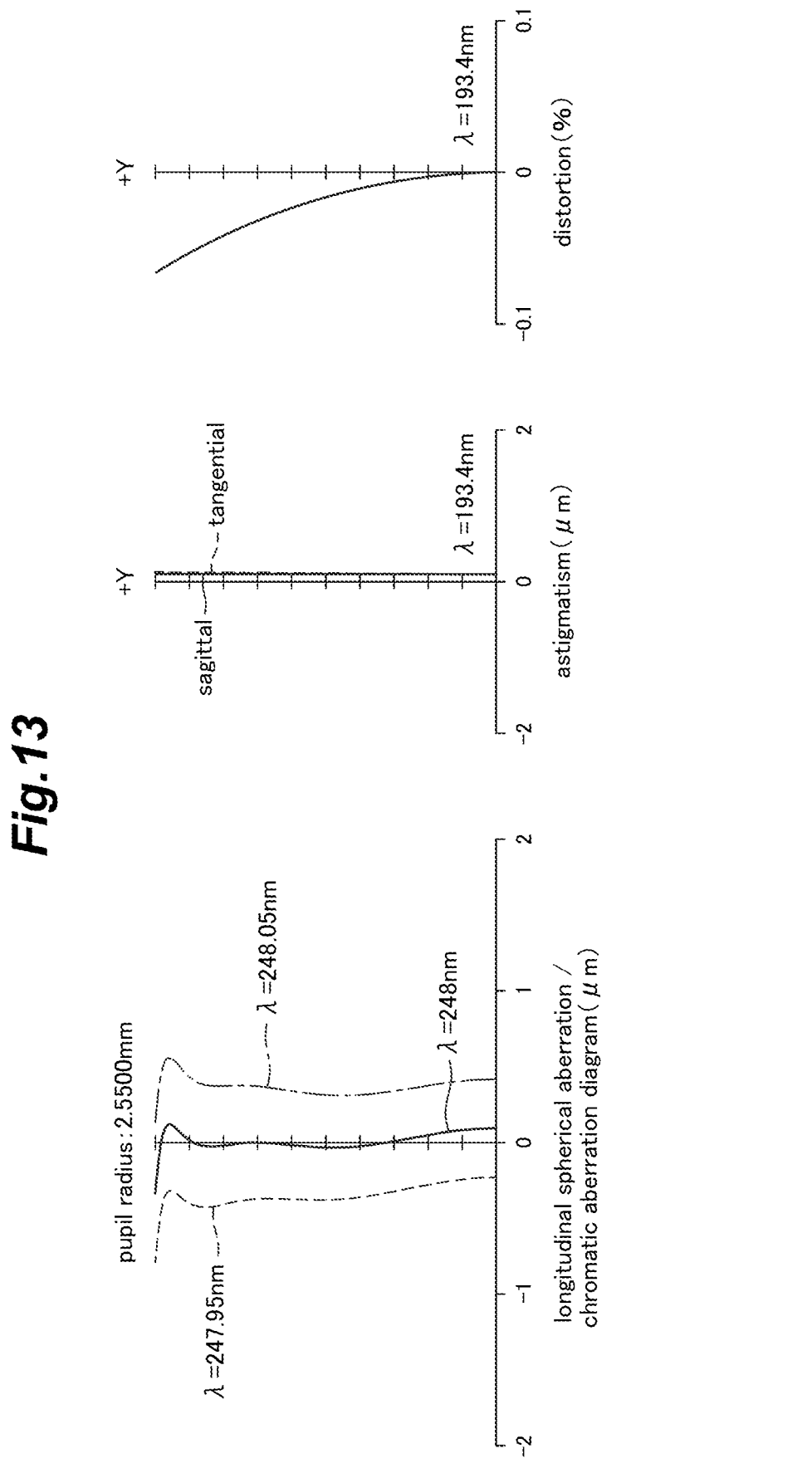
FIG. 13 is a longitudinal aberration diagram of the objective lens of Example 3.
Figure 14:
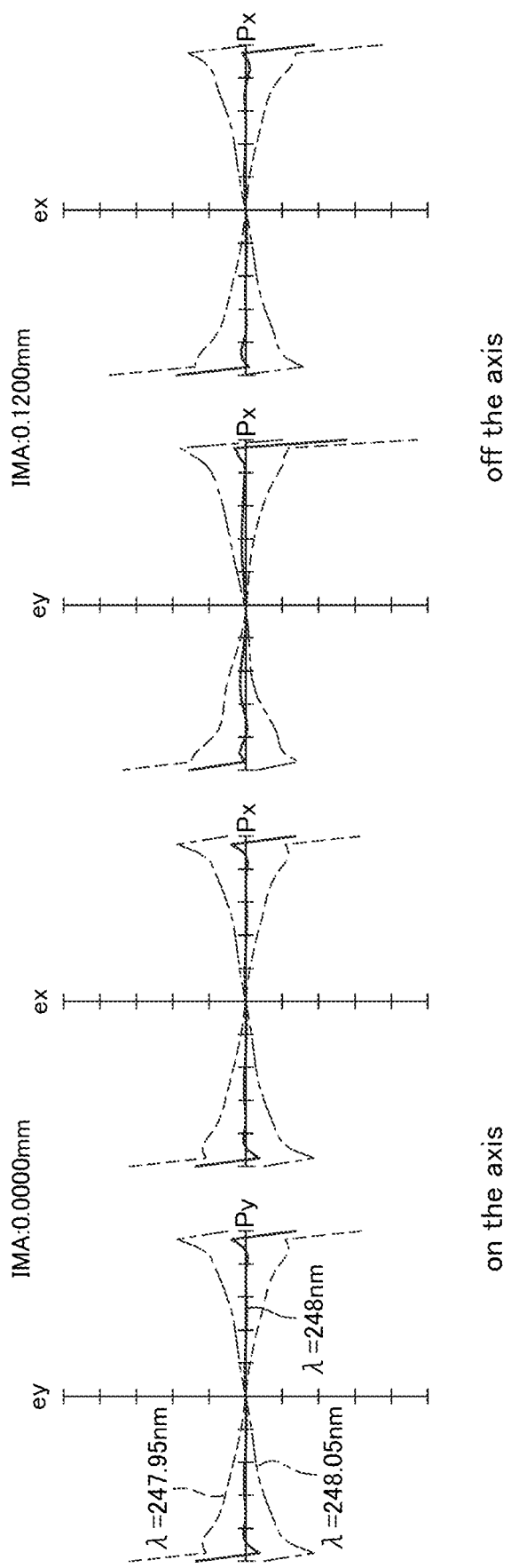
FIG. 14 is a lateral aberration diagram of the objective lens of Example 3.

FIGS. 12 to 14 respectively show a lens layout, a longitudinal aberration diagram, and a lateral aberration diagram of an objective lens 1 of Example 3. In the objective lens 1 of Example 3, the wavelength is 248 nm±0.05 nm, the focal length is 3 mm, NA is 0.85, the working distance is 6.27 mm, and the field of view φ is 0.24 mm. The retro ratio R is 6.27/3=2.09. The objective lens 1 of this embodiment is constituted of single lenses each of which is made of quartz or fluorite and has no cemented surface, namely, the objective lens 1 includes no cemented lens. As shown in FIG. 12, the objective lens 1 of this embodiment is a combination of a substantially afocal first lens group Gr1 and a positive second lens group Gr2 which are arranged in this order from the magnification side (the left side in the drawing). The first lens group Gr1 is constituted of a 1a lens L1a consisting of a negative single lens and a 1b lens L1b consisting of a positive single lens which are arranged in this order from the magnification side. The second lens group Gr2 is configured by a negative 2a lens group Gr2a, which is constituted of a 2a1 lens L2a1 consisting of a negative single lens and a 2a2 lens L2a2 consisting of a positive single lens, and a 2b lens group Gr2b which is positive as a whole, where the lens groups Gr2a and Gr2b are arranged in this order from the magnification side. Also, the focal length (f(Gr1)) of the first lens group Gr1=−263 mm and hence |f(Gr1)/f(total)|=87.66. Therefore, the condition of the present invention (|f(Gr1)/f (total)|>10) is satisfied. Since f(L1a)=−10.46 and f(L1b)= 22.46, the afocal ratio m of the first lens group Gr1 is −2.15 (m=f(L1b)/f (L1a)=−2.15).

The lens data of this example is shown in Table 3.

TABLE 3

| surface number | radius of curvature[mm] | thickness [mm] | material | refractive index at used wavelength (248 nm) |
|---|---|---|---|---|
| object plane | ∞ | ∞ | | |
| 1 | ∞ | 11.00940 | | |
| 2 (pupil plane) | ∞ | −11.00940 | | |
| 3 | −22.34020 | 1.80000 | quartz | 1.50859 |
| 4 | 7.17567 | 8.10609 | | |
| 5 | −44.43423 | 3.30000 | fluorite | 1.46801 |
| 6 | −8.70272 | 0.18000 | | |
| 7 | 36.35888 | 2.10000 | quartz | 1.50859 |
| 8 | 10.43492 | 14.55939 | | |
| 9 | 282.21761 | 4.80000 | fluorite | 1.46801 |
| 10 | −70.75262 | 11.35333 | | |
| 11 | −14.26950 | 2.40000 | quartz | 1.50859 |
| 12 | −323.27566 | 0.18000 | | |
| 13 | 132.70794 | 7.80000 | fluorite | 1.46801 |
| 14 | −22.88970 | 0.18000 | | |
| 15 | −138.82139 | 3.00000 | quartz | 1.50859 |
| 16 | 37.64485 | 0.70327 | | |
| 17 | 40.45785 | 10.80000 | fluorite | 1.46801 |
| 18 | −31.07047 | 0.18000 | | |
| 19 | −321.91029 | 3.00000 | quartz | 1.50859 |
| 20 | 35.04481 | 1.03422 | | |
| 21 | 40.75363 | 8.10000 | fluorite | 1.46801 |
| 22 | −76.13994 | 0.18000 | | |
| 23 | 42.70689 | 6.60000 | fluorite | 1.46801 |
| 24 | −143.05865 | 3.06598 | | |
| 25 | −40.96987 | 2.40000 | quartz | 1.50859 |
| 26 | −257.26589 | 0.18000 | | |
| 27 | 32.68750 | 3.00000 | quartz | 1.50859 |
| 28 | 19.97397 | 1.60880 | | |
| 29 | 23.15263 | 7.20000 | fluorite | 1.46801 |
| 30 | −317.70608 | 0.18000 | | |
| 31 | 16.32900 | 6.00000 | fluorite | 1.46801 |
| 32 | 43.20947 | 0.18000 | | |
| 33 | 10.53277 | 6.30000 | fluorite | 1.46801 |
| 34 | 31.08631 | 6.26999 | | |
| image plane | ∞ | 0.00000 | | |

Example 4

Figure 15:
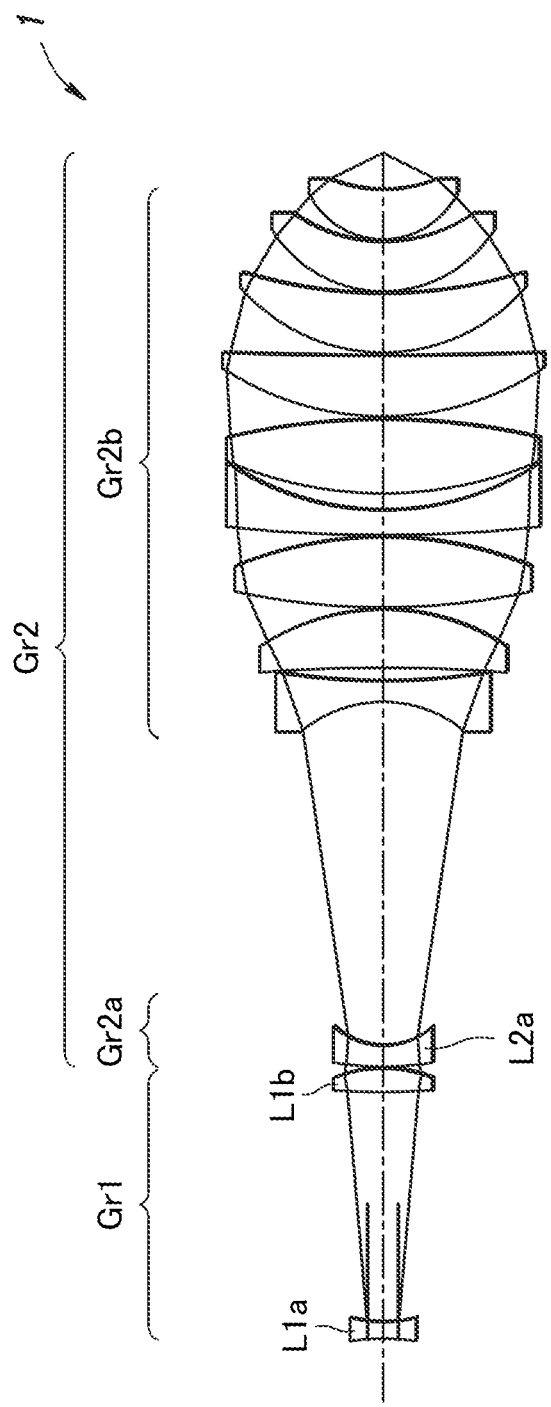
FIG. 15 is a lens layout of an objective lens of Example 4.
Figure 16:
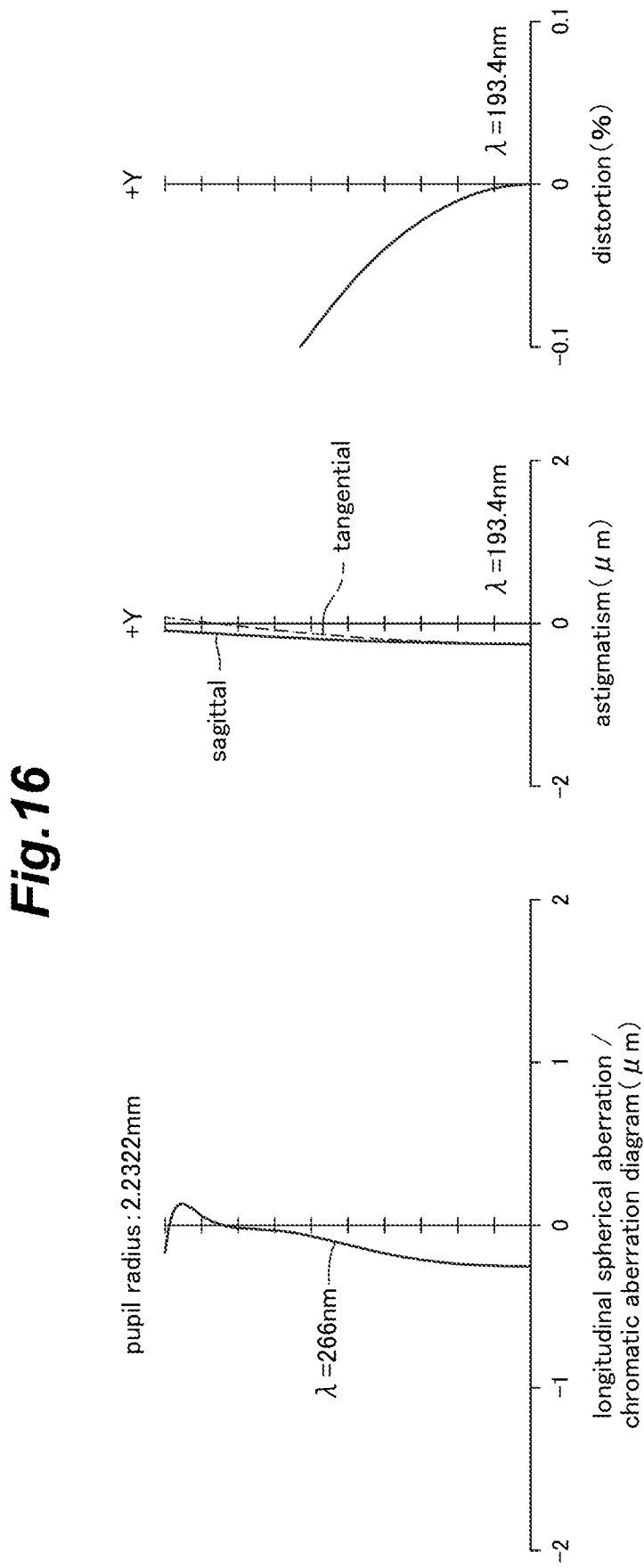
FIG. 16 is a longitudinal aberration diagram of the objective lens of Example 4.
Figure 17:
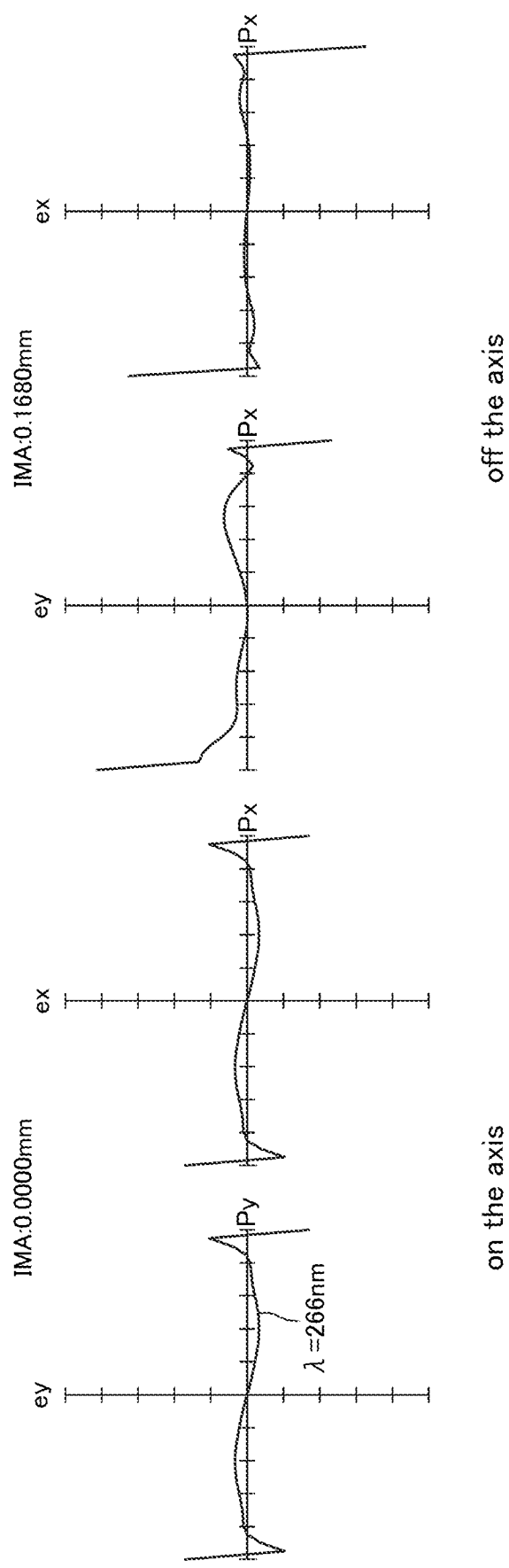
FIG. 17 is a lateral aberration diagram of the objective lens of Example 4.

FIGS. 15 to 17 respectively show a lens layout, a longitudinal aberration diagram, and a lateral aberration diagram of an objective lens 1 of Example 4. In the objective lens 1 of Example 4, the wavelength is 266 nm, the focal length is 3 mm, NA is 0.9, the working distance is 5.455 mm, and the field of view φ is 0.28 mm. The retro ratio R is 5.455/3=1.82. The objective lens 1 of this embodiment is constituted of single lenses each of which is made of quartz and has no cemented surface, namely, the objective lens 1 includes no cemented lens. As shown in FIG. 15, the objective lens 1 of this embodiment is a combination of a substantially afocal first lens group Gr1 and a positive second lens group Gr2 which are arranged in this order from the magnification side (the left side in the drawing). The first lens group Gr1 is constituted of a 1a lens L1a consisting of a negative single lens and a 1b lens L1b consisting of a positive single lens which are arranged in this order from the magnification side. The second lens group Gr2 is configured by a negative 2a lens group Gr2a consisting of a negative single lens and a 2b lens group Gr2b which is positive as a whole, where the lens groups Gr2a and Gr2b are arranged in this order from the magnification side. Also, the focal length (f(Gr1)) of the first lens group Gr1=30 mm and hence |f(Gr1)/f(total)|=10. Therefore, the condition of the present invention (|f(Gr1)/f(total)|>10) is satisfied. Since f(L1a)=−22.56 and f(L1b)= 33.48, the afocal ratio m of the first lens group Gr1 is −1.48 (m=f(L1b)/f(L1a)=−1.48).

The lens data of this example is shown in Table 4.

TABLE 4

| surface number | radius of curvature[mm] | thickness [mm] | material | refractive index at used wavelength |
|---|---|---|---|---|
| object plane | ∞ | ∞ | | |
| 1 | ∞ | 19.64991 | | |
| 2 (pupil plane) | ∞ | −19.64991 | | |
| 3 | −37.0391042 | 2.40000 | quartz | 1.4997 |
| 4 | 16.55834651 | 33.59331 | | |
| 5 | 114.6525463 | 3.36000 | quartz | 1.4997 |
| 6 | −19.4004423 | 0.36000 | | |
| 7 | 45.06164698 | 3.00000 | quartz | 1.4997 |
| 8 | 10.61277027 | 50.12860 | | |
| 9 | −18.6717664 | 3.00000 | quartz | 1.4997 |
| 10 | 76.59692963 | 2.01688 | | |
| 11 | −199.224507 | 8.40000 | quartz | 1.4997 |
| 12 | −32.6670737 | 0.36000 | | |
| 13 | 99.87463399 | 10.20000 | quartz | 1.4997 |
| 14 | −56.8863346 | 0.36000 | | |
| 15 | 221.2240368 | 3.60000 | quartz | 1.4997 |
| 16 | 41.19717627 | 2.38907 | | |
| 17 | 56.43839093 | 10.80000 | quartz | 1.4997 |
| 18 | −100.295915 | 0.36000 | | |
| 19 | 41.82310377 | 9.00000 | quartz | 1.4997 |
| 20 | 646.9533287 | 0.36000 | | |
| 21 | 27.30417917 | 8.64000 | quartz | 1.4997 |
| 22 | 69.6507288 | 0.36000 | | |
| 23 | 19.03638095 | 7.20000 | quartz | 1.4997 |
| 24 | 22.90987939 | 0.36000 | | |
| 25 | 11.99999877 | 7.20570 | quartz | 1.4997 |
| 26 | 20.44962809 | 5.45507 | | |
| image plane | ∞ | | | |

Example 5

Figure 18:
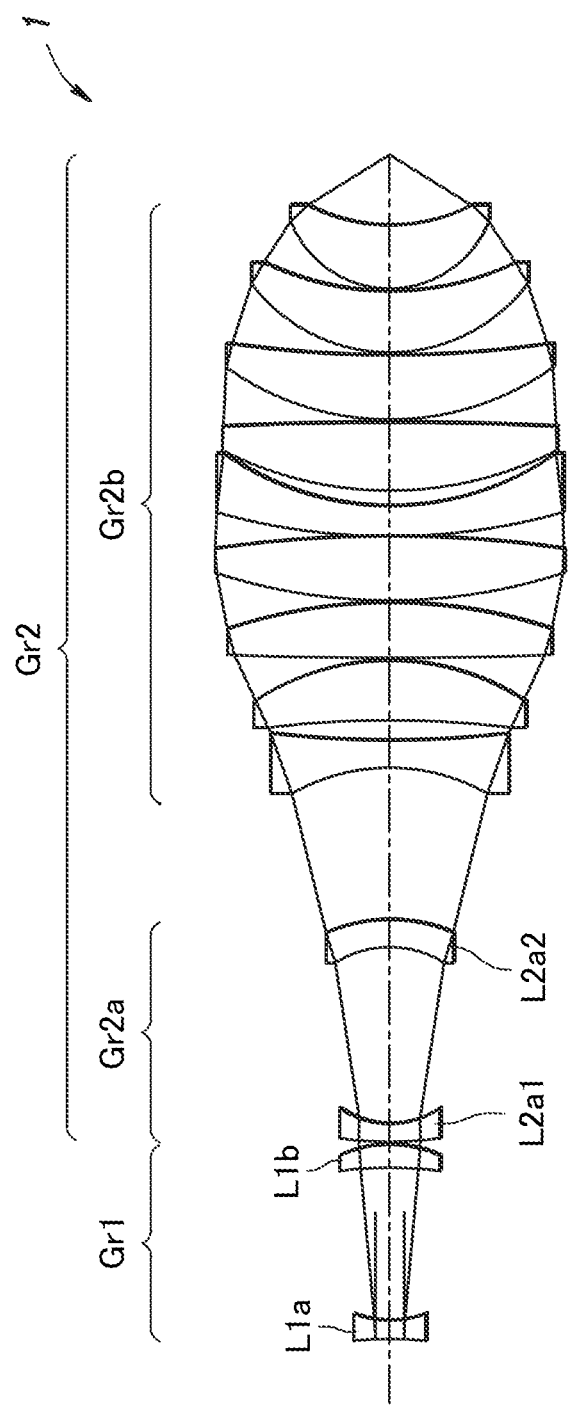
FIG. 18 is a lens layout of an objective lens of Example 5.
Figure 19:
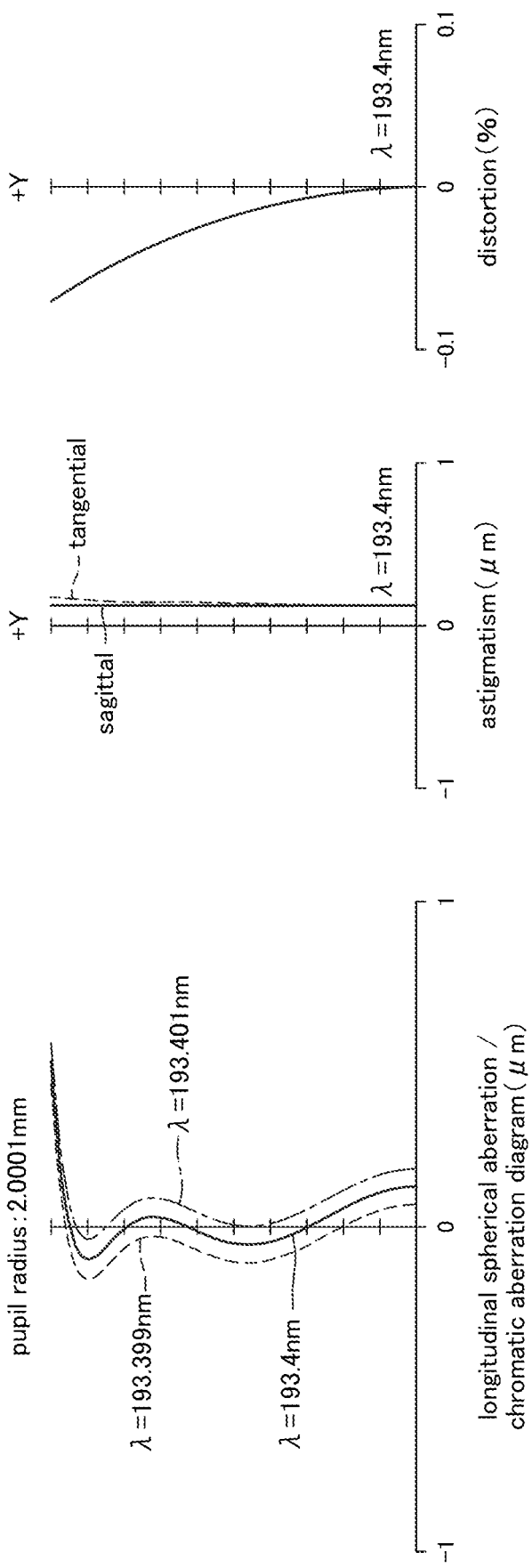
FIG. 19 is a longitudinal aberration diagram of the objective lens of Example 5.
Figure 20:
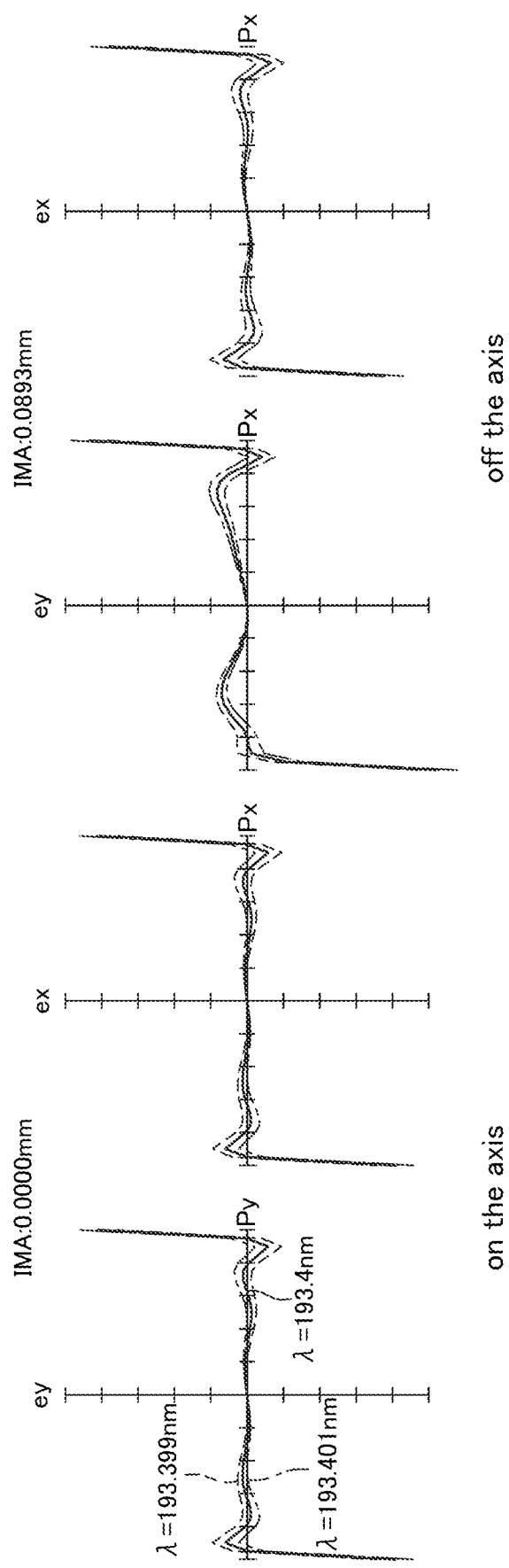
FIG. 20 is a lateral aberration diagram of the objective lens of Example 5.

FIGS. 18 to 20 respectively show a lens layout, a longitudinal aberration diagram, and a lateral aberration diagram of an objective lens 1 of Example 5. In the objective lens 1 of Example 5, the wavelength is 193.4 nm±0.001 nm, the focal length (f(total)) is 3 mm, NA is 0.85, the working distance is 9.96 mm, and the field of view φ is 0.18 mm. The retro ratio R is 9.96/3=3.32. The objective lens 1 of this embodiment is constituted of single lenses each of which is made of quartz or fluorite and has no cemented surface, namely, the objective lens 1 includes no cemented lens. As shown in FIG. 18, the objective lens 1 of this embodiment is a combination of a substantially afocal first lens group Gr1 and a positive second lens group Gr2 which are arranged in this order from the magnification side (the left side in the drawing). The first lens group Gr1 is constituted of a 1a lens L1a consisting of a negative single lens and a 1b lens L1b consisting of a positive single lens which are arranged in this order from the magnification side. The second lens group Gr2 is configured by a 2a lens group Gr2a, which is constituted of two negative single lenses, namely, a 2a1 lens L2a1 and a 2a2 lens L2a2, and is negative as a whole, and a 2b lens group Gr2b which is positive as a whole, where the lens groups Gr2a and Gr2b are arranged in this order from the magnification side. Also, the focal length (f(Gr1)) of the first lens group Gr1=1000 mm and hence |f(Gr1)/f(total)|= 333. Therefore, the condition of the present invention (|f (Gr1)/f(total)|>10) is satisfied. Since f(L1a)=−22.58 and f(L1b)=46.16, the afocal ratio m of the first lens group Gr1 is −2.04 (m=f(L1b)/f (L1a)=−2.04).

The lens data of this example is shown in Table 5.

TABLE 5

| surface number | radius of curvature[mm] | thickness [mm] | material | refractive index at used wavelength |
|---|---|---|---|---|
| object plane | ∞ | ∞ | | |
| 1 | ∞ | 17.61258 | | |
| 2 (pupil plane) | ∞ | −17.61258 | | |
| 3 | −53.69520 | 2.55090 | fluorite | 1.50135 |
| 4 | 14.57285 | 21.31467 | | |
| 5 | −55.11811 | 3.18863 | fluorite | 1.50135 |
| 6 | −16.61624 | 0.38264 | | |
| 7 | 49.86648 | 2.55090 | quartz | 1.56026 |
| 8 | 12.23482 | 24.58747 | | |
| 9 | −14.00981 | 3.82635 | quartz | 1.56026 |
| 10 | −22.13867 | 21.18026 | | |
| 11 | −27.83514 | 3.82635 | quartz | 1.56026 |
| 12 | 141.65723 | 2.83370 | | |
| 13 | −147.16946 | 8.29043 | fluorite | 1.50135 |
| 14 | −34.54239 | 0.38264 | | |
| 15 | 519.72317 | 7.65270 | fluorite | 1.50135 |
| 16 | −72.67901 | 0.38264 | | |
| 17 | 79.19309 | 8.92815 | fluorite | 1.50135 |
| 18 | −174.24501 | 0.38264 | | |
| 19 | 102.16855 | 3.82635 | quartz | 1.56026 |
| 20 | 40.46460 | 2.13908 | | |
| 21 | 51.34529 | 9.54037 | fluorite | 1.50135 |
| 22 | −488.09939 | 0.38264 | | |
| 23 | 39.36837 | 8.95366 | fluorite | 1.50135 |
| 24 | 155.38166 | 0.38264 | | |
| 25 | 24.13599 | 8.55827 | fluorite | 1.50135 |
| 26 | 40.88573 | 0.38264 | | |
| 27 | 14.83434 | 8.77510 | quartz | 1.56026 |
| 28 | 24.83423 | 9.96758 | | |
| image plane | ∞ | 0.00000 | | |

The parameters of each example are summarized in Table 6 and Table 7. Note that f() represents the focal length of the lens group or lens indicated by . Also, f(total) represents the focal length of the whole system.

TABLE 6

| | f(total) | f(Gr1) | |f(Gr1)/ f(total)| | working distance | ratio of working distance to focal length (retro ratio) |
|---|---|---|---|---|---|
| Example 1 | 3.00 | 67.22 | 22.41 | 9.88 | 3.29 |
| Example 2 | 3.00 | 48.05 | 16.02 | 7.70 | 2.57 |
| Example 3 | 3.00 | −263.14 | 87.71 | 6.27 | 2.09 |
| Example 4 | 3.00 | 30.11 | 10.04 | 5.46 | 1.82 |
| Example 5 | 3.00 | 1000.00 | 333.33 | 9.97 | 3.32 | unit of focal length and working distance [mm]

TABLE 7

| | f(L1a) | f(L1b) | f(L1b)/f(L1a) |
|---|---|---|---|
| Example 1 | −20.12 | 34.16 | −1.70 |
| Example 2 | −25.14 | 37.74 | −1.50 |
| Example 3 | −10.46 | 22.46 | −2.15 |
| Example 4 | −22.56 | 33.48 | −1.48 |

TABLE 7-continued

| | f(L1a) | f(L1b) | f(L1b)/f(L1a) |
|---|---|---|---|
| Example 5 | −22.58 | 46.16 | −2.04 | unit of focal length [mm]

Concrete embodiments of the present invention have been described in the foregoing, but the present invention is not limited to the above embodiments and may be modified or altered in various ways.

For example, in the above embodiment, the first lens group Gr1 is configured by the 1a lens L1a and the 1b lens L1b arranged in this order from the magnification side. In another embodiment, the first lens group Gr1 may be configured by a 1a lens group Gr1a having a negative power and a 1b lens group Gr1 b having a positive power which are arranged in this order from the magnification side. In this case, it is only required that the objective lens 1 satisfies the condition |f(Gr1)/f(total)|>10.

According to the present invention, it is possible to provide an objective lens 1 which has a high numerical aperture, a long working distance, and a short focal length and is constituted of a small number of lenses so as to be suitable for use in various inspection devices for semiconductors or FPDs, for example.

The invention claimed is:

1. An objective lens which is configured by multiple lenses, each consisting of a single lens having no cemented surface, and which has a retro ratio of 1.5 or higher, the retro ratio being a ratio of a working distance of the objective lens to a focal length of the objective lens, wherein
   the multiple lenses configure a first lens group that is substantially afocal and a second lens group having a positive power which are arranged in this order from a magnification side,
   the first lens group includes a 1a lens group having a negative power and a 1b lens group having a positive power which are arranged in this order from the magnification side, and provided that a focal length of the first lens group is represented by f(Gr1) and a focal length of a whole system of the objective lens is represented by f(total), a condition of |f(Gr1)/f(total)|>10 is satisfied,
   the second lens group includes a 2a lens group having a negative power and a 2b lens group having a positive power which are arranged in this order from the magnification side,
   the 1a lens group consists of a 1a lens consisting of a single lens, and the 1b lens group consists of a 1b lens consisting of a single lens, and
   provided that a focal length of the 1a lens is represented by f(L1a) and a focal length of the 1b lens is represented by f(L1b), a condition of −2.2<f(L1b)/f(L1a)<−1.4 is satisfied.

2. The objective lens according to claim 1, wherein every lens is configured by using either one or both of synthetic quartz and fluorite.

3. The objective lens according to claim 1, wherein the 2a lens group consists of two single lenses each having a negative focal length.

4. The objective lens according to claim 1, wherein the 2a lens group consists of one single lens.

5. The objective lens according to claim 1, wherein the 2a lens group consists of two single lenses which are a single lens having a negative power and a single lens having a positive power arranged in this order from the magnification side.

* * * * *